United States Patent
Feneis et al.

(10) Patent No.: US 12,224,571 B2
(45) Date of Patent: Feb. 11, 2025

(54) APPARATUS FOR DAMPING MECHANICAL VIBRATIONS IN ELECTRICAL LINES THROUGH WHICH MODULATED CURRENTS FLOW

(71) Applicant: NEXANS, Courbevoie (FR)

(72) Inventors: Michael Feneis, Floss (DE); Helmut Steinberg, Floss (DE)

(73) Assignee: NEXANS, Courbevoie (FR)

( * ) Notice: Subject to any disclaimer, the term of this patent is extended or adjusted under 35 U.S.C. 154(b) by 122 days.

(21) Appl. No.: 18/098,536

(22) Filed: Jan. 18, 2023

(65) Prior Publication Data
US 2023/0246432 A1 Aug. 3, 2023

(30) Foreign Application Priority Data
Jan. 28, 2022 (EP) .................................... 22305101

(51) Int. Cl.
H02G 7/14 (2006.01)
(52) U.S. Cl.
CPC .................................... *H02G 7/14* (2013.01)
(58) Field of Classification Search
CPC .............. H02G 7/14; G10K 11/17873; G10K 11/17857; G10K 2210/3211; G10K 2210/3055; G10K 2210/1282; G10K 2210/1291; G10K 2210/3226
USPC ........................................................ 318/445
See application file for complete search history.

(56) References Cited

U.S. PATENT DOCUMENTS

| | | | | |
|---|---|---|---|---|
| 5,427,102 A | * | 6/1995 | Shimode | H04R 3/00 324/318 |
| 9,429,092 B2 | * | 8/2016 | Rosero | F02B 77/08 |
| 2008/0140226 A1 | * | 6/2008 | Ganev | G06Q 10/04 700/30 |
| 2018/0115265 A1 | * | 4/2018 | Nayfeh | G01M 15/05 |
| 2018/0134301 A1 | * | 5/2018 | Dudar | B60W 10/184 |
| 2018/0164383 A1 | * | 6/2018 | Hsieh | H01M 10/486 |
| 2021/0082388 A1 | * | 3/2021 | Hartmann | G10K 11/17883 |
| 2021/0157312 A1 | * | 5/2021 | Cella | G01M 13/045 |

OTHER PUBLICATIONS

European Search Report dated Jul. 9, 2022.

\* cited by examiner

*Primary Examiner* — Gabriel Agared
(74) *Attorney, Agent, or Firm* — Sofer & Haroun, LLP

(57) ABSTRACT

An apparatus (100) for damping vibrations in electrical lines (10) through which modulated currents flow has at least one sound or vibration sensor (102) oriented towards the line (10) or attached to the line, at least one actuator (104) connected to the line, and a control circuit (200) which is supplied, via respective signal lines (108), with signals generated by the at least one sound or vibration sensor (102) that represent sound or vibrations. The control circuit controls the at least one actuator (104) via respective control lines (110) such that this actuator counteracts the vibration of the line (10).

13 Claims, 2 Drawing Sheets

APPARATUS FOR DAMPING MECHANICAL VIBRATIONS IN ELECTRICAL LINES THROUGH WHICH MODULATED CURRENTS FLOW

RELATED APPLICATION

This application claims the benefit of priority from European Patent Application No. 22 305 101.2, filed on Jan. 28, 2022, the entirety of which is incorporated by reference.

FIELD

The invention relates to the damping of mechanical vibrations in electrical lines, in particular of electrical lines for supplying drive components of electric and hybrid vehicles.

BACKGROUND

Electric currents in drive components of electric and hybrid vehicles, that is to say motors and batteries, for example, are generally controlled by power electronics. Modulated, for example pulsed, control is usually used here, for instance pulse width modulation, amongst other things in order to keep the electrical losses small and to still achieve good power control.

The powers realized in drive components of electric and hybrid vehicles are often in the high two- or even three-digit kilowatt range such that currents of over 100 A still flow even in the case of high voltages of 400 V or else 800 V. These currents generate a magnetic field in electrical lines, which magnetic field in turn generates a force acting on these electrical lines. High modulated, in particular pulsed, currents generate a magnetic field generated with the frequency of the modulation, together with a correspondingly acting force. Electrical lines in electric and hybrid vehicles are laid in or along bodywork parts and are fixed there at particular distances. In particular, a force acting on the electrical line can move this electrical line between the fixation points. A pulse-like acting force can accordingly move the electrical line in a pulse-like manner. With corresponding frequency of the electric currents flowing though the line, a vibration lying in the frequency range that is acoustically perceptible to humans can thus be produced due to airborne and/or structure-borne sound.

Proceeding from the above, the present invention has the object of providing an apparatus and a method in order to damp vibrations in electrical conductors through which modulated currents flow.

SUMMARY OF THE INVENTION

This object is achieved by the apparatus specified in Claim 1 and the method specified in Claim 8. Advantageous configurations and further developments are described in the respective dependent claims.

An apparatus according to a first aspect of the invention comprises at least one sound or vibration sensor oriented towards the line or attached to the line, at least one actuator connected to the line, and a control circuit. The control circuit can have a microprocessor, volatile and non-volatile memories connected thereto, one or more microphone inputs connected to sound or vibration sensors, and one or more control outputs connected to actuators. The control circuit is supplied, via respective signal lines, with signals generated by the at least one sound or vibration sensor that represent sound or vibrations. The control circuit controls the at least one actuator via respective control lines such that this actuator counteracts the vibration of the line.

The at least one actuator can have, for example, an electromagnetic or piezoelectric drive which is controlled by the control circuit such that it generates a force which counteracts the force generated by the current flow. Preferably here, the at least one actuator is fastened to a structure on or in which the line is laid such that vibrations emanating from the actuator or introduced into the latter are introduced into the structure only in a damped manner or are previously eliminated. The actuator can be mounted in an elastically damping element, for example.

In one or more configurations, the at least one sound or vibration sensor allows spatial resolution of the vibration amplitude along at least part of the line. The control circuit is configured here to control the at least one actuator such that the maximum vibration amplitude is reduced at a point along the part of the line detected by the sound or vibration sensor. The actuator is controlled by the control circuit here such that the reduction in the vibration of the line does not necessarily take place at the point at which the actuator acts upon the line. Rather, the actuator itself can introduce a vibration into the cable, which vibration disrupts a vibration generated by the current flowing in the line by way of destructive interference and thus leads to an overall smaller vibration amplitude, or generates a shift in the frequency of the vibration which is perceived as less disruptive or is damped by other design measures. This configuration takes account of the fact that an actuator cannot always be arranged at a point of the line that is particularly susceptible to vibrations.

In one or more configurations, the sound or vibration sensor is an optical microphone. Optical microphones can detect changes in the optical refractive index within a vibrating medium which are caused by local density changes generated by vibrations. Depending on the medium, it is also possible to localize the greatest amplitude along the measurement section, for example in an optical fibre by way of Time-Domain Reflectometry (TDR for short).

In one or more configurations, the control circuit is supplied with a signal which represents information about the modulation, for example the pulse frequency, the pulse duration, and about the current intensity of the electric current flowing in the line. Such a signal can be transmitted, for example, by a control device which controls the current in the line. The control circuit uses this information in order to excite the at least one actuator with a frequency and/or phase which counteracts the vibration caused by the current. In these configurations, the demands on the sound or vibration sensor with regard to sensitivity or frequency resolution may be smaller. Furthermore, in these configurations, the control circuit can control the at least one actuator with a frequency sweep in a learning phase, that is to say with an alternating signal of which the frequency constantly passes through a predefined range, and, using the at least one sound or vibration sensor, can sense the amplitude and the frequency of the acoustically perceptible sound caused by the vibrations of the line. A correlation between the amplitude of the perceptible sound and the underlying current in the line can be formed here. Thus the at least one actuator can be controlled with an appropriate control signal even without an accurate measurement already at the moment at which the line is subjected to a current. Measurements of the sound or of the vibrations of the line can then be used to identify changes in the vibrations of the line with otherwise identical currents, identical modulation, etc., such as those that are caused, for example, by temperature- or ageing-related changes in the materials or deposits of dirt on the line. On the basis of these measurements, the correlation can then be adjusted or expanded, for example, by the temperature. Thus, using information of a thermometer, for example of an external thermometer of a motor vehicle, and of the signal transmitted by the control device, an appropriate control signal for the at least one actuator can be used right at the start of use.

The apparatus can be used in particular in electric and hybrid vehicles in order to damp vibrations in electrical lines caused by the drive control.

A method according to a second aspect of the invention comprises detecting, in a control circuit, vibrations of a line through which a modulated electric current flows, by means of at least one sound or vibration sensor. Based on the detected vibrations of the line, the control circuit generates control signals for at least one actuator with the aim of damping the vibrations of the line, and outputs these control signals. The method can be performed continuously in a closed control loop.

In one or more configurations of the method, the control circuit receives a signal which provides information about a current intensity and a modulation of the current flowing in the line. On the basis of the information, the control circuit selects a control signal for the at least one actuator from a correlation table, and outputs this control signal. Repetition in a continuous control loop can also take place here.

In one or more configurations, the method comprises, in a learning phase, receiving a signal which provides information about a current intensity and a modulation of the current flowing in the line. The control circuit applies a frequency sweep to at least one actuator and detects the vibrations of the line. The frequency sweep and the detecting of the vibration are optionally repeated with changed amplitude of the control signal. A control signal in which the vibrations of the line are maximally damped is ascertained from the characteristic map thus obtained, and the ascertained signal is stored in a correlation table together with the associated current in the line and the modulation thereof.

A computer program product according to a further aspect of the invention contains program instructions which, when executed by a processor of a control circuit connected to at least one sound or vibration sensor and to at least one actuator, cause said control circuit to perform one or more configurations and further developments of the method described above.

The computer program product can be stored on a computer-readable medium or data carrier. The medium or the data carrier can be physically embodied, for example as a hard disk, CD, DVD, flash memory or the like, but the medium or the data carrier can also comprise a modulated electrical, electromagnetic or optical signal which can be received by a computer by means of a corresponding receiver and can be stored in the memory of the computer.

BRIEF DESCRIPTION OF THE DRAWING

The invention will be explained in more detail below by way of example on the basis of an embodiment with reference to the accompanying figures. All figures are purely schematic and not to scale. In the figures.

Identical or similar elements may be provided with identical or similar reference signs in the figures.

DETAILED DESCRIPTION

Figure 1:
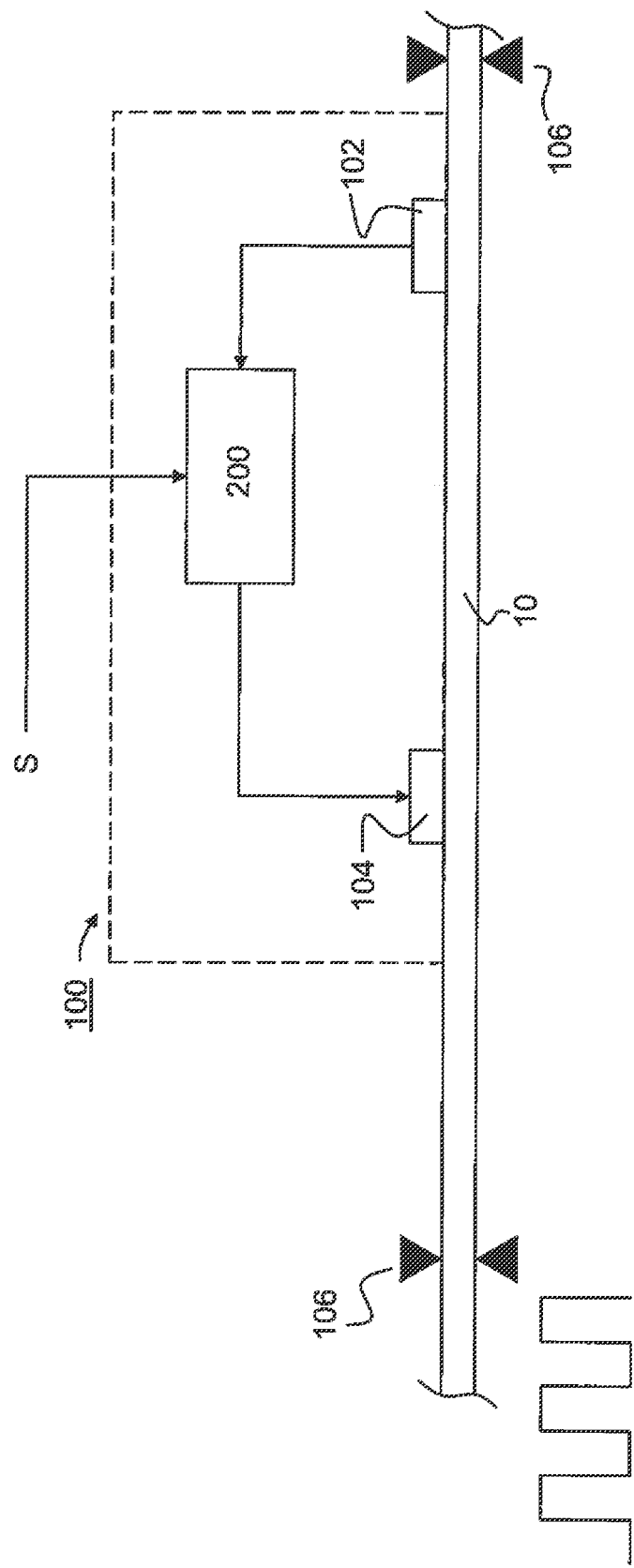
FIG. 1 shows a schematic illustration of an exemplary apparatus for damping vibrations in electrical lines through which modulated currents flow.

FIG. 1 shows a schematic illustration of an exemplary apparatus 100 for damping vibrations in electrical lines 10 through which modulated currents flow. In the example shown in FIG. 1, the line 10 is connected to a structure, which is not shown in the figure, at two fixation points 106. Between the fixation points 106, the line may change its position, in particular may vibrate transversely with respect to its longitudinal extent. A modulated current, indicated by the square wave in the figure, flows through the line 10. The modulated current leads to electromagnetic forces which act upon the line and can cause this line to vibrate. Depending on the frequency and intensity of the modulated current, the line 10 can vibrate more or less strongly between the fixation points 106 and generate an audible sound in the process. It is also possible to strike the structure with the frequency of the vibration. The apparatus 100, formed of the components arranged inside the dashed border in the figure, comprises at least one sound or vibration sensor 102 which senses sound or vibrations emanating from a line 10 and applies a corresponding signal to a control circuit 200. Control circuit 200 analyses the signal or the signals applied by the one or more sound or vibration sensors and applies a control signal to one or more actuators 104, each of which exerts a corresponding force which acts on the line 10 and counteracts the vibration of the line 10. The control circuit 200 is furthermore supplied with a signal S which is output by a control device, which modulates the current through the line 10 and is not shown in the figure, and which transmits information about the current intensity and the modulation of the current.

Figure 2:
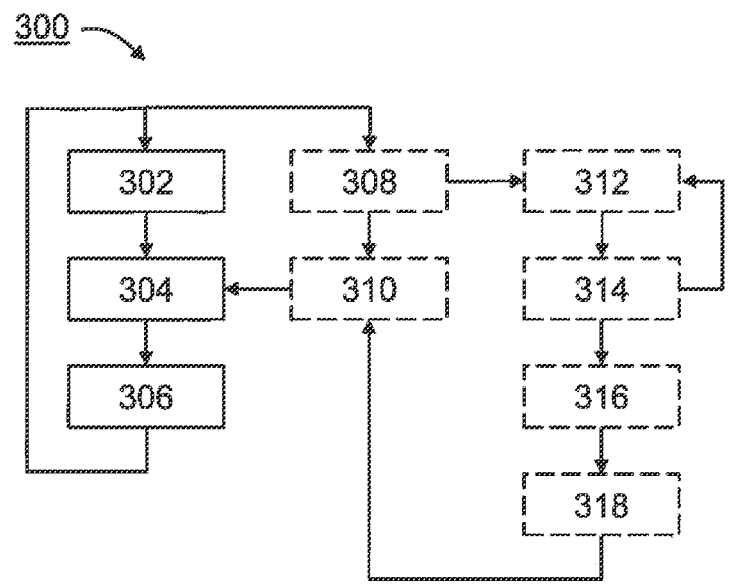
FIG. 2 shows a flowchart of an exemplary embodiment of the method according to the invention.

FIG. 2 shows a flowchart of an exemplary embodiment of the method 300 according to the invention. In step 302, vibrations of the line 10 are detected by means of at least one sound or vibration sensor. In step 304, control signals for at least one actuator 104 are generated, which control signals are output in step 306.

Additionally, in an optional step 308, a signal S which provides information about a current intensity and a modulation of the current flowing in the line 10 can be received. On the basis of the signal S, in step 310, control signals for at least one actuator are selected from a correlation table and additionally taken as a basis for the generating in step 304. By this means, already at the start of the modulated current flow, an appropriate control signal can be applied to at least one actuator such that the vibration of the line can be damped more quickly. Continuous control can nevertheless continue to take place.

The correlation table can be filled with data in a learning phase. To this end, starting from step 308, a frequency sweep can be applied to at least one actuator in step 312, while vibrations of the line are detected in step 314. The frequency sweep can be repeated with changed amplitude of the control signal of the at least one actuator. In step 316, a control signal in which the vibrations of the line 10 are maximally damped is ascertained from the previously generated characteristic map, which control signal is stored in the correlation table in step 318 and is available for the selecting in step 310.

Figure 3:
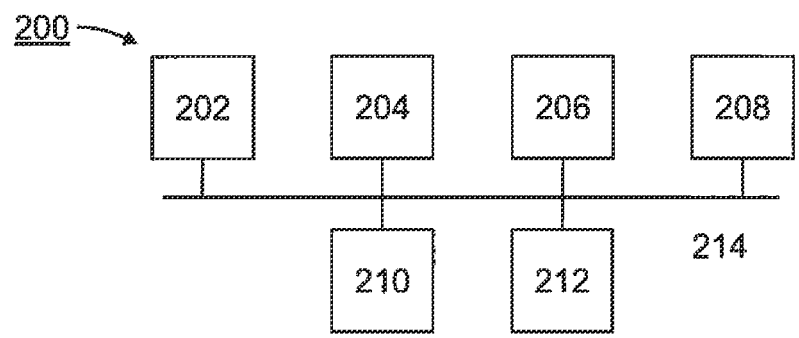
FIG. 3 shows an exemplary block diagram of a control circuit configured for performing one or more aspects of the method according to the invention.

FIG. 3 shows an exemplary block diagram of a control circuit 200 configured for performing one or more aspects of the method according to the invention. Control circuit 200 comprises, in addition to a microprocessor 202, volatile and non-volatile memories 204 and 206, respectively, at least one control output 208, at least one microphone input 210 and optionally at least one signal input 212. The components of the control circuit 200 are communicatively connected to each other via one or more data connections or buses 214. The non-volatile memory 206 contains computer program instructions which, when they are executed by the microprocessor 202, configure the control circuit 200 of the apparatus 100 to perform the method 300 according to the invention.

LIST OF REFERENCE SIGNS

- 10 line
- 100 apparatus
- 102 sound/vibration sensor
- 104 actuator
- 106 fixation point
- 200 control circuit
- 202 microprocessor
- 204 volatile memory
- 206 non-volatile memory
- 208 control output
- 210 microphone input
- 212 signal input
- 214 data connection/bus
- 300 method
- 302 detecting
- 304 generating
- 306 outputting
- 308 receiving
- 310 selecting
- 312 applying
- 314 detecting
- 316 ascertaining
- 318 storing
- S signal

The invention claimed is:

1. An apparatus for damping mechanical vibrations in electrical lines through which modulated currents flow, said apparatus comprising:
   at least one sound or vibration sensor oriented towards the line or attached to the line, wherein the at least one sound and vibration sensor comprises an optical microphone,
   at least one actuator connected to the line, and
   a control circuit which is supplied, via respective signal lines, with signals generated by the at least one sound or vibration sensor that represent sound or vibrations, and which controls the at least one actuator via respective control lines such that this actuator counteracts the vibration of the line, wherein the at least one sound or vibration sensor allows spatial resolution of the vibration amplitude along at least part of the line, and wherein the control circuit is configured to control the at least one actuator such that a maximum vibration amplitude is reduced.

2. The apparatus according to claim 1, wherein the at least one actuator has an electromagnetic or piezoelectric drive.

3. The apparatus according to claim 1, wherein the at least one actuator is fastened to a structure on or in which the line is laid such that vibrations emanating from the actuator or introduced into the latter are introduced into the structure only in a damped manner or are previously eliminated.

4. The apparatus according to claim 1, wherein the control circuit is supplied with a signal which represents information about the pulse frequency, the pulse duration and/or the current intensity of the electric current flowing in the line, and wherein the control circuit is configured, based on the signal, to excite a respective actuator with a frequency and/or phase which counteracts the vibration caused by the current.

5. The apparatus according to claim 4, wherein the control circuit is configured to control the at least one actuator with a frequency sweep in a learning phase, and to form a correlation from the signal representing information about the current flowing in the line and from the amplitude and frequency of the vibration of the line sensed by the at least one sound or vibration sensor, which correlation contains, for a particular pulse frequency, amplitude and/or pulse duration, a control signal for the at least one actuator, which signal effects damping of the vibration of the line.

6. A method for damping vibrations in electrical lines through which modulated currents flow, by means of an apparatus according to claim 1, comprising:
   detecting spatially resolved vibrations of the line by means of said at least one sound or vibration sensor comprising said optical microphone,
   generating control signals for said at least one actuator, and
   outputting the control signals for controlling said at least one actuator such that said maximum vibration amplitude is reduced by counteracting the vibration of the line.

7. The method according to claim 6, further comprising:
   receiving a signal which provides information about a current intensity and a modulation of the current flowing in the line,
   selecting control signals for said at least one actuator from a correlation table,
   generating control signals for at least one actuator, and
   outputting the control signals.

8. The method according to claim 6, further comprising, in a learning phase:
   receiving a signal which provides information about a current intensity and a modulation of the current flowing in the line,
   applying a frequency sweep to at least one actuator,
   detecting vibrations of the line by means of said at least one sound or vibration sensor,
   repeating the frequency sweep with a changed amplitude of the control signal of the at least one actuator,
   ascertaining a control signal in which the vibrations of the line are maximally damped, and
   storing the control signal and the current intensity and modulation of the current in a correlation table.

9. A computer program product comprising program instructions which, when the program is executed by a microprocessor of a control circuit of an apparatus for damping mechanical vibrations in electrical lines through which modulated currents flow, said apparatus comprising:
   at least one sound or vibration sensor oriented towards the line or attached to the line,
   at least one actuator connected to the line, and
   a control circuit which is supplied, via respective signal lines, with signals generated by the at least one sound or vibration sensor that represent sound or vibrations, and which controls the at least one actuator via respective control lines such that this actuator counteracts the vibration of the line, cause the method according to claim 8 to be performed.

10. A computer-readable medium on which the computer program product according to claim 9 is stored.

11. An electric or hybrid vehicle having an apparatus according to claim 1.

12. A method for damping vibrations in electrical lines through which modulated currents flow, by means of an apparatus according to claim 1, comprising:
   detecting vibrations of the line by means of said at least one sound or vibration sensor,
   generating control signals for said at least one actuator, and
   outputting the control signals,
   receiving a signal which provides information about a current intensity and a modulation of the current flowing in the line,
   selecting control signals for said at least one actuator from a correlation table,
   generating control signals for said at least one actuator, and
   outputting the control signals.

13. The method according to claim 12, further comprising, in a learning phase:
   receiving a signal which provides information about a current intensity and a modulation of the current flowing in the line,
   applying a frequency sweep to said at least one actuator,
   detecting vibrations of the line by means of said at least one sound or vibration sensor,
   repeating the frequency sweep with a changed amplitude of the control signal of said at least one actuator,
   ascertaining a control signal in which the vibrations of the line are maximally damped, and
   storing the control signal and the current intensity and modulation of the current in a correlation table.

* * * * *